United States Patent
Chow et al.

(10) Patent No.: US 6,941,298 B2
(45) Date of Patent: Sep. 6, 2005

(54) SYSTEM AND METHOD FOR PROVIDING RESULT SETS USING EJB QUERY LANGUAGE

(75) Inventors: Thorick Chow, El Cerrito, CA (US); Seth White, San Francisco, CA (US)

(73) Assignee: BEA Systems, Inc., San Jose, CA (US)

( * ) Notice: Subject to any disclaimer, the term of this patent is extended or adjusted under 35 U.S.C. 154(b) by 0 days.

(21) Appl. No.: 10/342,573

(22) Filed: Jan. 15, 2003

(65) Prior Publication Data

US 2003/0149689 A1 Aug. 7, 2003

Related U.S. Application Data

(60) Provisional application No. 60/349,606, filed on Jan. 18, 2002.

(51) Int. Cl.[7] .............................................. G06F 17/30
(52) U.S. Cl. ....................................... 707/3; 707/104.1
(58) Field of Search ................... 707/1–10, 100–104.1, 707/200–205

(56) References Cited

U.S. PATENT DOCUMENTS

| | | |
|---|---|---|
| 6,199,195 B1 | 3/2001 | Goodwin et al. .............. 717/1 |
| 6,269,373 B1 | 7/2001 | Apte et al. ..................... 707/10 |
| 6,591,272 B1 * | 7/2003 | Williams ..................... 707/102 |
| 2002/0049749 A1 * | 4/2002 | Helgeson et al. .............. 707/3 |

OTHER PUBLICATIONS

DeMichiel et al., "JavaOne, Sun's 2000 worldwide Java Developer Conference", 2000, "TS–1032, Enterprise JavaBeans 2.0", pp. 1–34.*

* cited by examiner

Primary Examiner—Mohammad Ali
(74) Attorney, Agent, or Firm—Fliesler Meyer, LLP

(57) ABSTRACT

The invention provides a set of enhancements to the EJB Query Language ("EJB QL") for providing ResultSets using EJB QL and to efficiently access databases using ejbSelect methods within Enterprise Java Beans. Particularly, these EJBQL language extensions allow for the selection and retrieval of ResultSets. Since the use of the invention is expressed in terms of object relational constructs defined in an EJB deployment, it allows for the efficient retrieval of data from a Database expressed in terms of the relationships defined in that EJB deployment.

20 Claims, 7 Drawing Sheets

SYSTEM AND METHOD FOR PROVIDING RESULT SETS USING EJB QUERY LANGUAGE

CLAIM OF PRIORITY

This application claims priority from provisional application "SYSTEM AND METHOD FOR PROVIDING RESULT SETS USING EJB QUERY LANGUAGE" Application No. 60/349,606 filed Jan. 18, 2002, and which application is incorporated herein by reference.

FIELD OF THE INVENTION

The invention relates to methods used to access databases using Enterprise Java Beans.

BACKGROUND

An ever increasing number of e-commerce providers or e-businesses rely on application server technology as the lifeblood of their business. Application servers form a proven foundation for supporting e-commerce applications, providing the presentation, business and information-access logic, security and management services, and underlying infrastructure required for highly scalable and mission-critical software applications. Increasingly, the demands of today's modern businesses require support for a new breed of Web and wireless applications, helping to meet the needs of increasingly sophisticated customers.

One such application server, WebLogic Server, from BEA Systems, Inc. San Jose, Calif., is based on an implementation of the Java 2 Enterprise Edition (J2EE) specification. WebLogic Server is used as the backbone for many of today's most sophisticated e-business applications, playing an integral role in a tightly integrated, comprehensive infrastructure that delivers commerce, personalization, campaign management, enterprise integration, workflow management, and business-to-business collaboration. From Web and wireless clients to Windows, Unix, and mainframe servers, WebLogic Server manages all of the underlying complexities of a business' e-commerce applications, allowing the organization to focus instead on delivering new and innovative products and services.

A typical application server, including WebLogic™ Server™, supports a variety of clients, including Web browsers, and wireless devices. On the server side, WebLogic Server supports leading Unix™, Linux™, Windows™, and mainframe operating systems. On the back-end, WebLogic Server integrates with relational databases, messages queues, and legacy systems. WebLogic Server provides support for features such as Servlets, Java Server Pages (JSP™), Enterprise Java Beans (EJB™), Java Messaging Service (JMS™), to provide access to standard network protocols, database, and messaging systems. When developing applications, developers can create, assemble, and deploy components that use these services.

In a typical deployment, WebLogic Server also includes a Web server for hosting static content and dynamic J2EE™ Web applications. J2EE Web applications typically include a collection of HTML/XML pages, Java Server Pages, Servlets, Java™ classes applets, images, multimedia files, and other file types. WebLogic Server may also be integrated with other Web servers such as Apache™ Microsoft IIS™, or Netscape™ Web servers. Web components usually provide the presentation logic for browser-based or wireless applications, while EJB components encapsulate business objects and processes, and are used to access data resources.

One problem associated with standard application server systems that use EJBs to access databases is that the operations required to retrieve the values of multiple fields per EJB must be explicitly specified in user written code in terms of object manipulation. Typically, in the traditional model, the developer must retrieve a set of EJBs, each of which satisfies the search criteria of a standard EJB QL query, then call each of these EJBs individually to retrieve the desired field values. The traditional model is an inefficient and time-consuming process. A more efficient method would bypass the requirement to manipulate the set of EJBs that contain the data that are the target of retrieval.

UNIX™ is a registered trademark in the United States and other countries, exclusively licensed through X/Open Company, Ltd. Sun™, Sun Microsystems™, Java™, J2EE™, EJB™, JSP™, and JMS™ are trademarks or registered trademarks of Sun Microsystems, Inc. in the United States and other countries. BEA™, WebLogic™, and WebLogic™ Server™ are registered trademarks of BEA Systems, Inc. in the United States and other countries. Windows™ and Microsoft IIS™ are registered trademarks of Microsoft, Inc. in the United States and other countries. Netscape™ is a registered trademark of Netscape Communications Corporation in the United States and other countries.

SUMMARY

The invention provides a set of enhancements to the EJB Query Language (EJB QL) to efficiently access a data store using Enterprise Java Beans. Particularly, these EJB QL language extensions allow for the selection and retrieval of ResultSets. When the application developer writes a query that specifies the return of multiple fields from a single bean type or from multiple bean types, the system efficiently extracts the requested data from the database and returns the data as a ResultSet. This system bypasses the need to engage in the expensive object retrieval and manipulation operations that would be required if the traditional model had been used to accomplish the equivalent task.

In one embodiment, the invention provides EJB QL features which are comprised of a set of enhancements to the standard Query Language and further increase the overall usefulness of the Query Language. The present invention supports additional features such as: QL Subqueries, Aggregate Functions, and QL Queries Returning ResultSets.

DETAILED DESCRIPTION

The invention provides a set of enhancements to the EJB Query Language (EJB QL) to efficiently access a database using Container Managed Persistence (CMP) Enterprise Java Beans EJB's. Particularly, the EJB QL language extensions allow for the selection and retrieval of ResultSets. A ResultSet is a construct which allows multiple fields and/or aggregates of fields to be returned to the user.

The ResultSet capability allows for more efficient retrieval of multiple fields and aggregates of fields than would be possible using standard CMP EJB query models. The ResultSet feature is resource-efficient because the application client is not required to access EJB objects in order to extract information from the database. Rather, the present invention allows direct access to query data. The bean developer defines the EJB QL query for an ejbSelect method. An EJB QL parser translates the query into an organized tree which represents the query. The EJB QL parser is generated from a unique grammar file which allows the parser to recognize a SELECT clause that returns a ResultSet. The tree that is produced by the EJB QL parser is translated into the target language of the database (SQL), and the database interprets the SQL query. The EJB QL parser and translator are referred to herein as the "EJB QL Compiler". After the ejbSelect method is invoked by a bean instance, the database returns the requested data to the ResultSet object. The data within the ResultSet object is available for use by any bean within the container, including session and message beans. Thus, the ResultSet capability allows the user to bypass the need to engage in expensive object retrieval and manipulation.

The EJB QL features provided by the invention is comprised of a set of enhancements to the Query Language implementation that are made available to the users of the WebLogic Application server. These enhancements apply to Container Managed Persistence EJBs. The features of the present invention support additional features such as: QL Subqueries, Aggregate Functions, and QL Queries Returning ResultSets.

Definitions of Terms, Acronyms, and Abbreviations

CMP: Container Managed Persistence as defined in the EJB specification. EJB: In this specification, EJB refers to Enterprise Java Beans using Container Managed Persistence.

Figure 1:
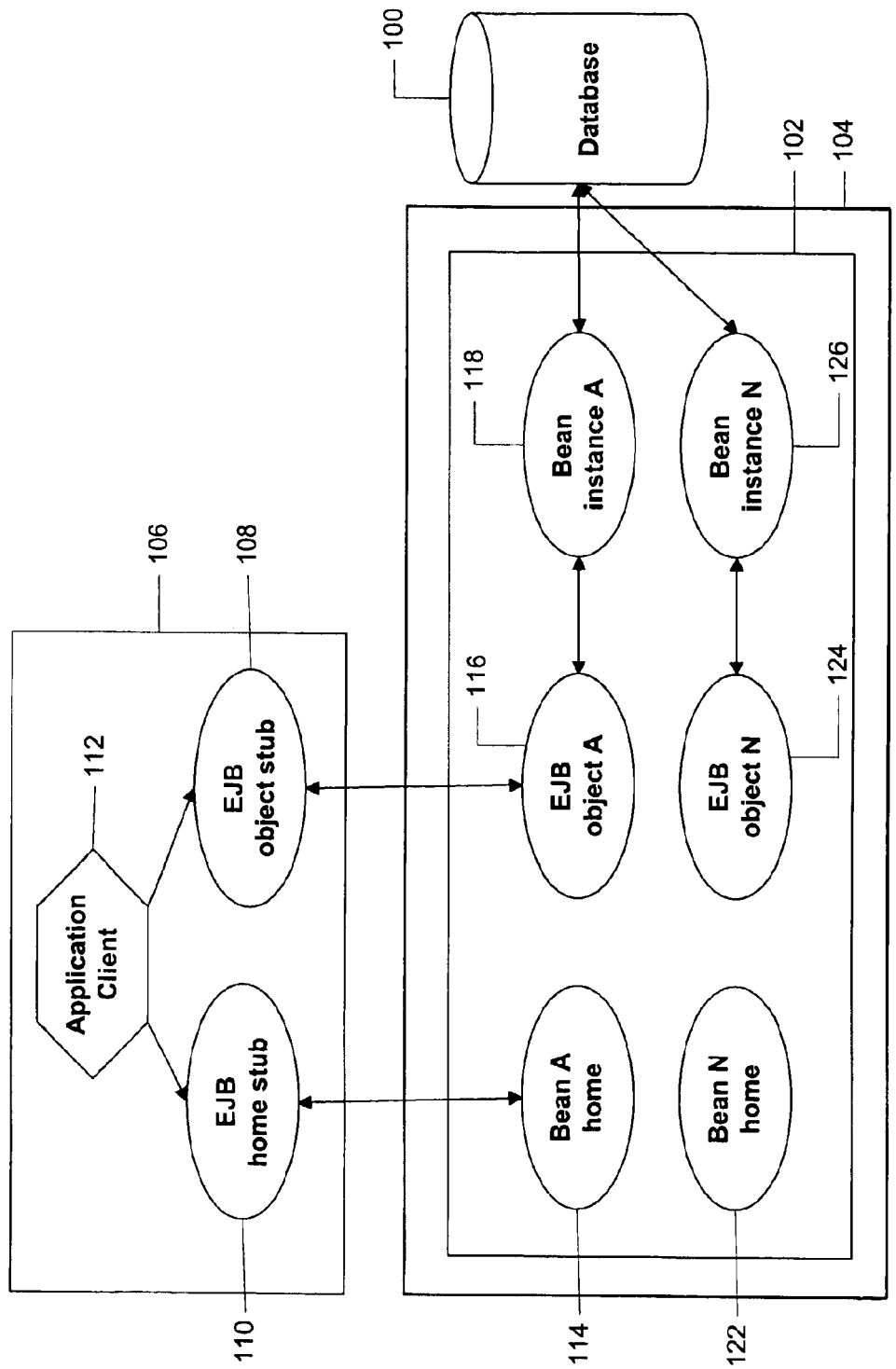
FIG. 1 shows a system using a traditional method to retrieve data from a database by using a bean that is obtained via a finder method call.

FIG. 1 shows a traditional model for accessing a database using EJBs and finder methods. In order to access an enterprise bean, an application client 112 must obtain an EJB home stub 110 using the JNDI package. In one embodiment, the client may obtain a JNDI connection within the application server using the getInitialContext( ) method. The method used to obtain the JNDI connection may vary depending on the EJB vendor.

After the home stub 110 has been created on the client side 106, the client 112 uses a finder method, such as findByPrimaryKey( ), to lookup a particular bean. When the client invokes a finder method, the container 102 uses the EJB home object on the server side. The container 102 comprises a portion of the application server 104. The EJB home object implements the bean's home interface. For example, the bean home 114 implements bean A's home interface. Additionally, the bean home 122 object implements bean N's home interface.

The home stub 110 requests the bean's home object to have an instance of the EJB returned for use by the client. The container 102 initializes a bean instance 118 using data extracted from the database 100 and using its primary key to identify the entity object within the container 102. The EJB container 102 then creates an EJB object 116 on the server side to implement the bean's remote or local interface. The EJB home 114 returns an EJB reference (object stub 108) to the client 112.

The object stub 108 implements either the remote or the local interface of the Bean Instance 118. The EJB home returns a remote object reference if the client invokes a method on the remote interface. The EJB home returns a local reference if the client invokes a method on the local interface. The client works through the object stub 108 to invoke business methods on the bean instance 118. The object stub 108 relays the method calls to the EJB object 116; The EJB object 116 delegates the method calls to the bean instance 118. If the bean instance 118 will be used to access data, the bean instance 118 will either return data that was previously extracted from the database 100, or it will load data from the database 100 which will be returned.

The process is similar for additional beans. For example, the EJB container creates an EJB object 124 and the home 122 returns an additional object stub to the client. Additionally, EJB object 124 delegates Bean N's method calls to Bean N's corresponding bean instance 126.

Figure 2:
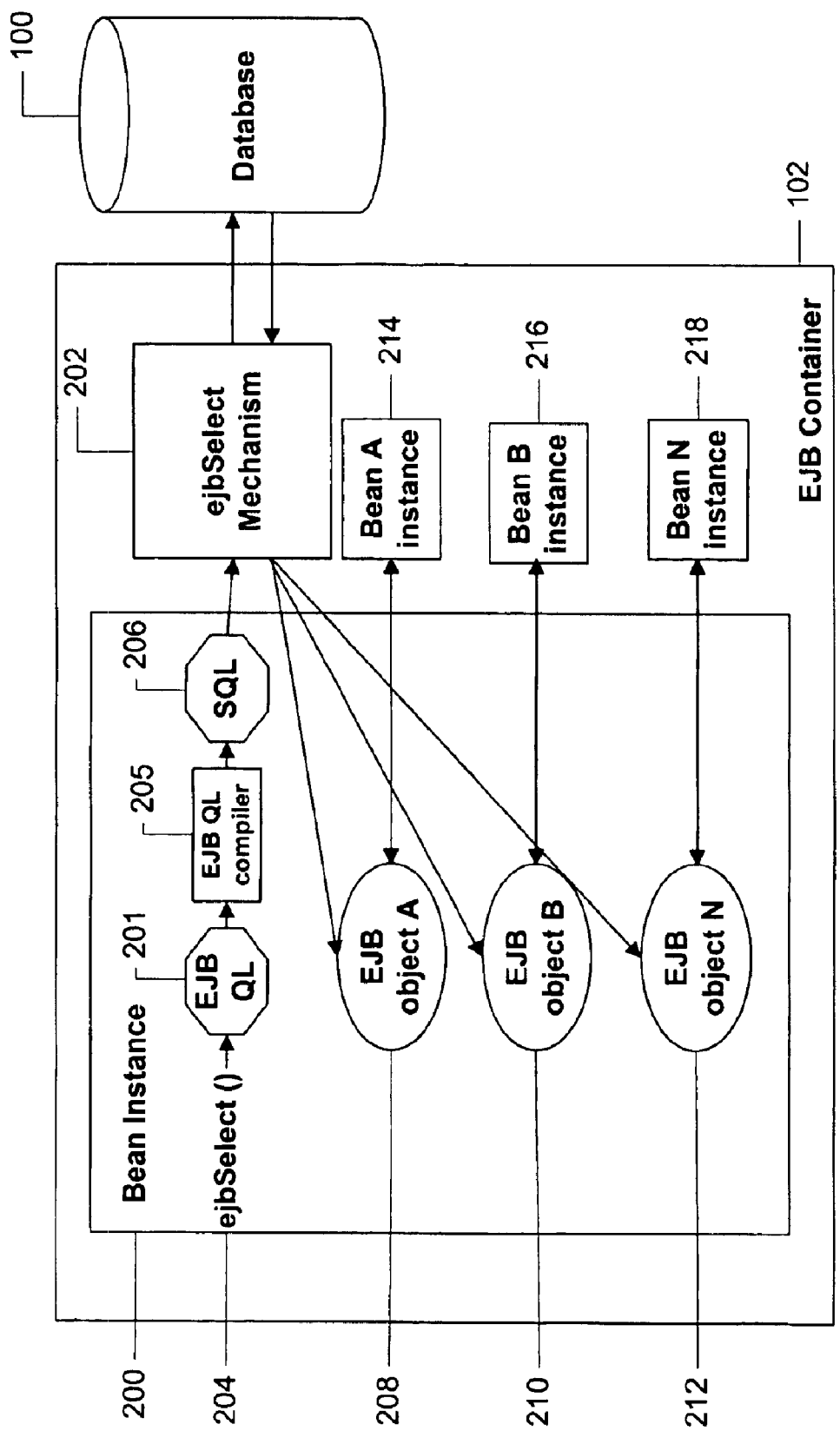
FIG. 2 shows the use of a traditional method to retrieve a bean using an ejbSelect method call.

FIG. 2 shows a traditional model for returning beans from ejbSelect methods. After an application client invokes a finder method, the bean instance 200 located by the finder method may be used invoke an ejbSelect method. A bean developer may customize an ejbSelect method for a CMP Entity Bean. An ejbSelect method 204 is declared in the bean's abstract bean class. The bean developer specifies an EJB QL query to be used by the container. The container translates the EJB QL statement 201 into an SQL statement 206 using the EJB QL compiler 205. When the ejbSelect method is called, the bean instance 200 passes the SQL query 206 to the ejbSelect mechanism 202. The ejbSelect mechanism 202 sends the SQL query 206 to the database 100 for the bean field data. The database 100, or other persistent store, processes the translated query. The EJB container 102 initializes the Bean A instance 214. The ejbSelect mechanism 202 then returns the corresponding EJB object A 208 as the result of the ejbSelect. The ejbSelect process may be repeated to return different bean types by defining and using a different ejbSelect method and query for each bean type to be returned. In FIG. 2, separate ejbSelect methods are used to effect the initialization of Bean Instances 216 and 218 and the return of the corresponding EJB objects 210 and 212.

Figure 3:
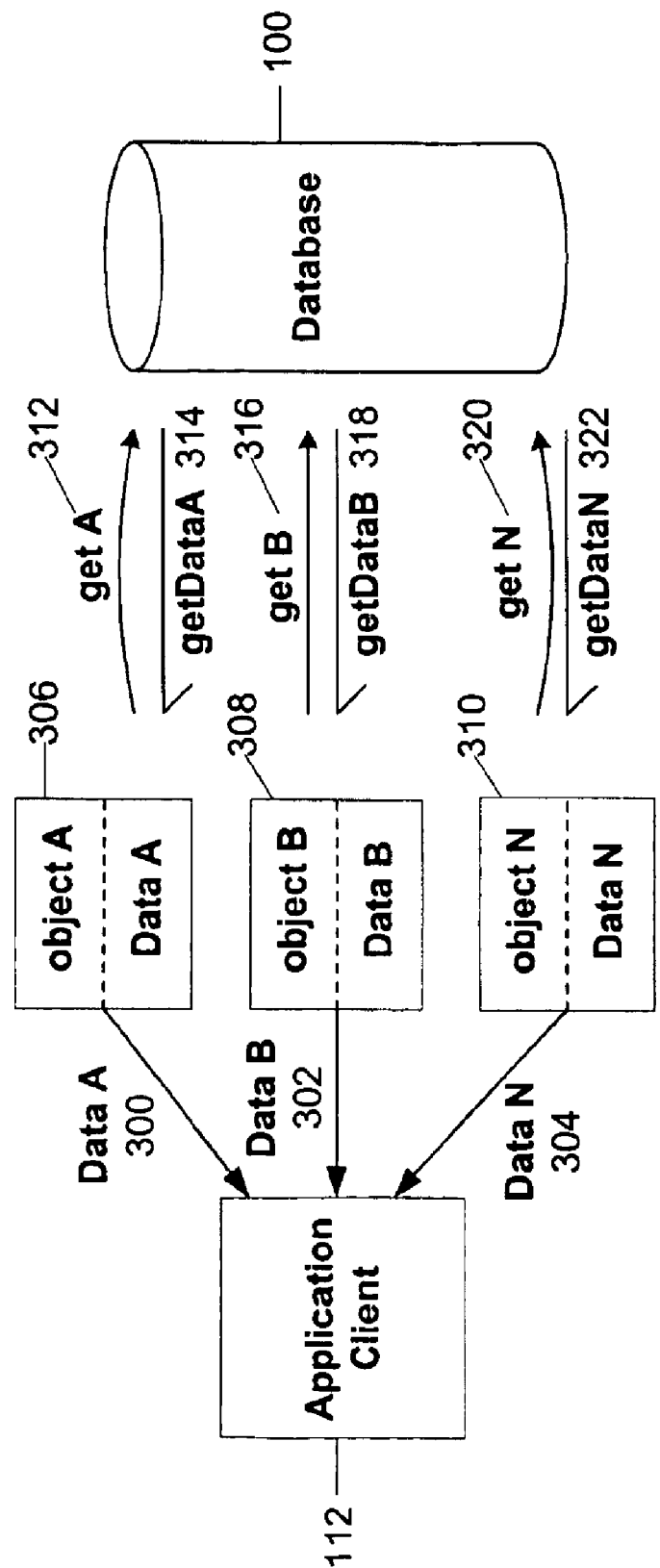
FIG. 3 shows the use of a traditional method to retrieve data from a database using beans that were returned from an ejbSelect method call.

FIG. 3 shows a traditional model for accessing different fields from beans of different types. Three separate ejbSelect methods are executed to return the three EJB Objects 306, 308 and 310, each of which is of a different bean type. The traditional model requires that methods must be invoked on each object from which field data is to be retrieved. The bean instance 200 executes a method getA 312 on object 306 and retrieves Data A 300. The bean instance then executes a method getB 316 on object 308 and retrieves Data B 302. The bean instance then executes a method getN 320 on object 310 and retrieves Data N 304. Retrieving the additional fields from the objects 306, 308 and 310 requires that 'get' methods must be executed for each additional field to be retrieved.

Figure 4:
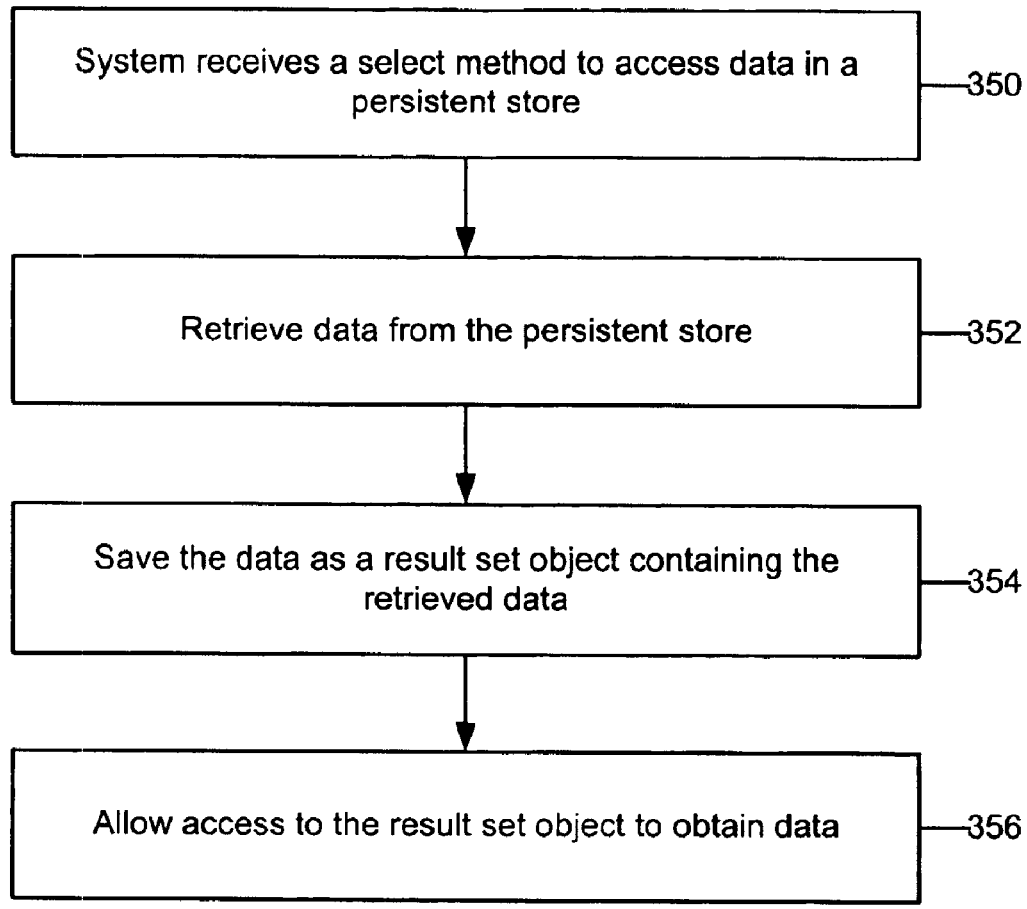
FIG. 4 shows a summary of a method in accordance with an embodiment of the invention that allows the system to return data in the form of a result set.

FIG. 4 shows a summary of a process or method in accordance with an embodiment of the invention that allows the system to return data in the form of a result set. As shown in FIG. 4, the process includes the step 350 of receiving at the system a select method to access data in a persistent store, such as a database. In step 352, the data is retrieved from the persistent store, and in step 354, is saved as a result set object which includes the retrieved data. In step 356, the system allows access to the data stored in the result set.

Figure 5:
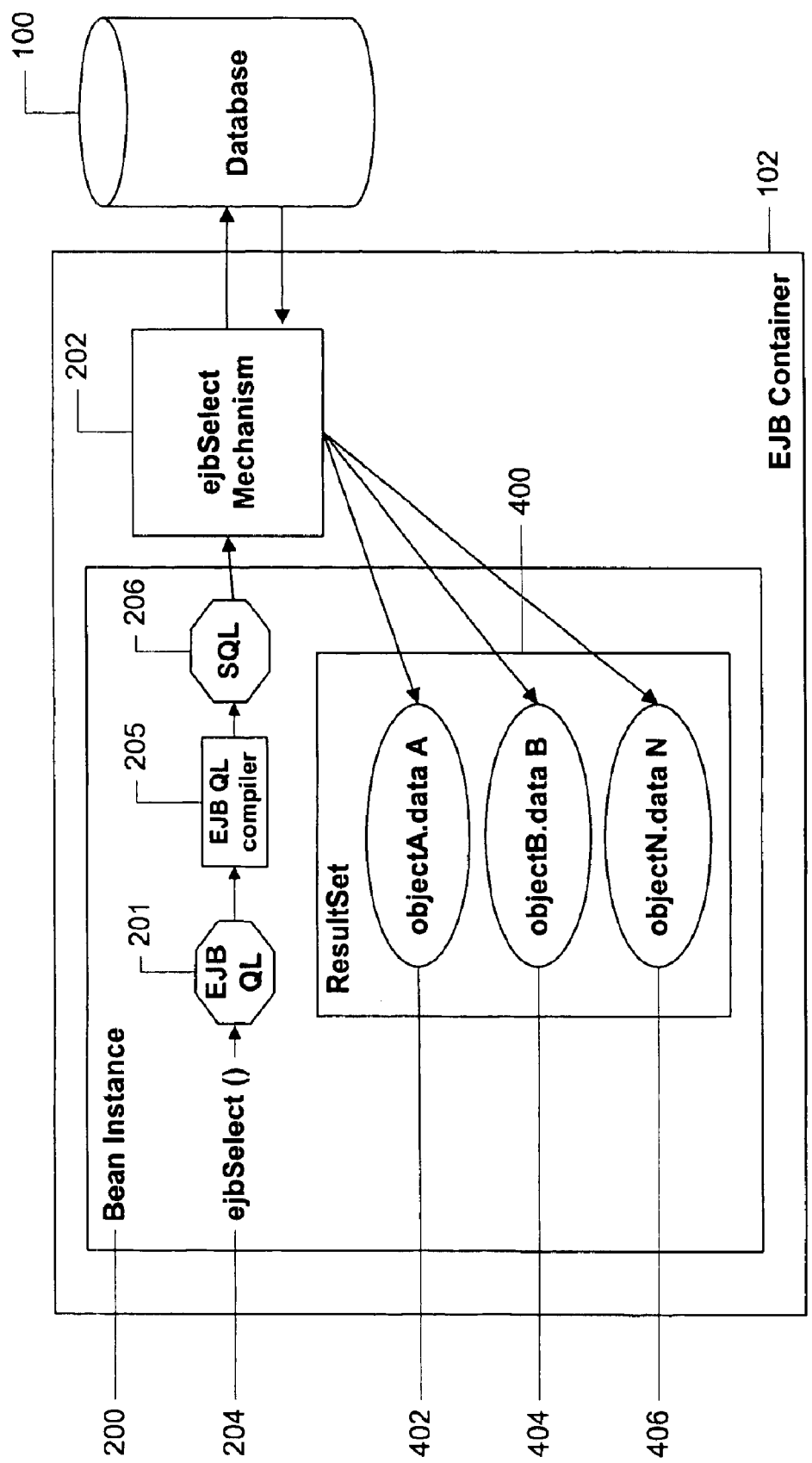
FIG. 5 shows a system in accordance with the present invention retrieving multiple field, multiple bean type data from the database using an ejbSelect method call.

FIG. 5 shows a system in accordance with an embodiment of the invention that allows an application client access to Database 100 using EJBs, object relationships and Result-Sets 400. The present invention bypasses the requirement of accessing objects in order to retrieve data from the Database 100 by allowing direct database access to multiple field, multiple bean type data from the definition of the EJB QL query in the EJB. The bean developer specifies the EJB QL query to be used by the ejbSelect method 204. The EJB QL query 201 (an example of which is shown as 600 in FIG. 6) is written such that it specifies the return of multiple fields from multiple bean types. The EJB QL compiler 205 translates the EJB QL query 201 into an SQL query 206. To invoke this query at runtime, the Bean Instance 200 calls the select method in the EJB that defines the query, in the same manner as in the traditional model. When the select method is called, the Bean Instance 200 passes the SQL query 206 to the ejbSelect mechanism 202. The ejbSelect mechanism 202 passes the SQL query to the Database 100. The Database 100 returns the requested data to the ejbSelect mechanism 202. The ejbSelect mechanism 202 returns the requested data in the form of a single ResultSet 400 to the user. The ResultSet provides access to data A 402 (which consists of data A1 and data A2 from 602), data B 404 (which consists of data B1 and data B2 from 602) and data N 406 (which consists of data N1 and data N2 from 602).

The present invention allows the ejbSelect mechanism 202 to return the desired data as a ResultSet 400, wherein the requested data contains multiple fields from multiple bean types. This method bypasses the additional steps that would be required when utilizing the traditional model which consist of returning corresponding objects 306, 308, 310 and invoking individual get methods 312, 316, 320 (and others) to retrieve multiple data fields 300, 302, 304 (and others).

Figures 6, 7:
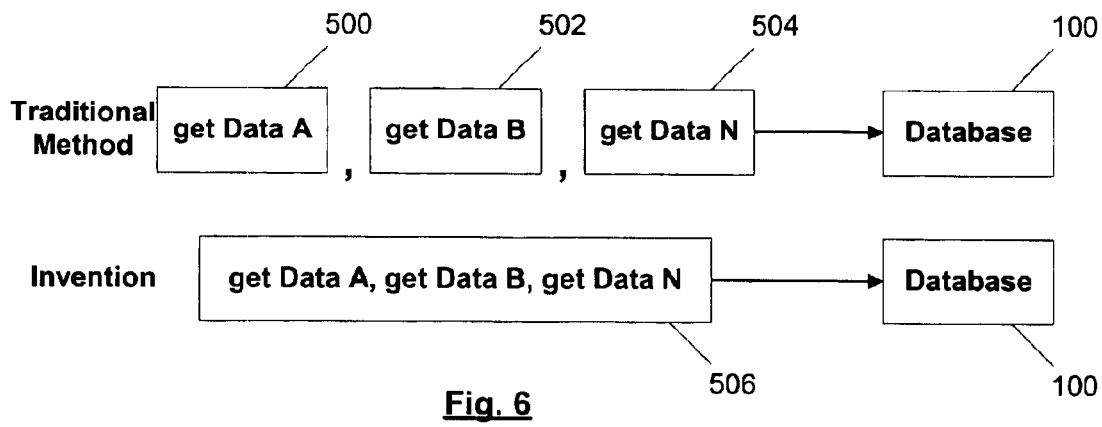
FIG. 6 illustrates by comparison the difference between a traditional object based data access scheme, and a data access scheme in accordance with the invention.
FIG. 7 shows an example of a data request in accordance with the invention wherein the returned results consists of multiple fields from multiple bean types.

FIG. 6 illustrates by comparison the differences between a traditional object-based data access scheme, and the scheme in accordance with the present invention. Using the traditional method, multiple getData calls 500, 502, 504 are required to be invoked on corresponding individual objects in order to retrieve data from different tables and columns in the Database 100. Using the invention, only a single, composite, SQL query 506 is required to retrieve the same set of data. The data is returned in the form of a ResultSet 400.

In the traditional method, in the body of an EJB QL query, the SELECT clause allows the bean developer to define only one type of object or field to be returned. A single-valued select method returns a local or remote object or a single column value corresponding to a single bean field. A multi-valued select method returns a collection of EJB objects of a single type or a collection of column values corresponding to a single bean field. The present invention allows the bean developer to SELECT multiple fields from multiple bean types. The bean developer may also SELECT single fields from multiple bean types with a single query.

FIG. 7 shows an example of a multiple field, multiple bean type data request in accordance with the invention. As shown in FIG. 7, the invention allows a bean developer to request multiple fields from multiple bean types to be returned in a ResultSet 400 using the EJB QL query 600 which includes necessary and optional components. In the example shown, the bean developer can specify a SELECT component 602, namely 'SELECT objA.dataA1, objA.dataA2, objB.dataB1, objB.dataB2, objN.dataN1, objN.dataN2' to select each of dataA1 and dataA2, dataB1 and dataB2, and dataN1 and dataN2 at the same time. The FROM component 604 of the query, in this example 'FROM objABean AS objA; objBBean AS objB; objNBean AS objN', specifies the domain from which data will be retrieved. The AS qualifier maps the destination object to those specified in the SELECT component, and ties the two components together. For example, in this case the developer specifies SELECTing objA.dataA1 FROM objABean AS objA—the system implicitly knows from the common reference to objA that these two elements should be mapped together.

In FIG. 7, The optional WHERE 606 clause is used to place selection criteria on the domain of objABeans such that objA.field 1 must equal the value "2". The AND clauses place further limitations on the domain. The AND 608 clause qualifies object B Bean such that field 1 of object B =field 2 of object A. The AND 610 clause qualifies object N such that field 3 of objectN=field 2 of objectB. Thus, each candidate row of data objA.dataA, objB.dataB, objN.dataN shall be selected subject to the conditions specified in the complete WHERE 606 clause.

It will be evident to one skilled in the art that the example given above is merely illustrative of the general operation of an embodiment of the invention, and that other selection mechanisms and qualifiers can be used to specify object relationships and to further customize the selection and retrieval of ResultSets and other data.

Figures 8, 9:
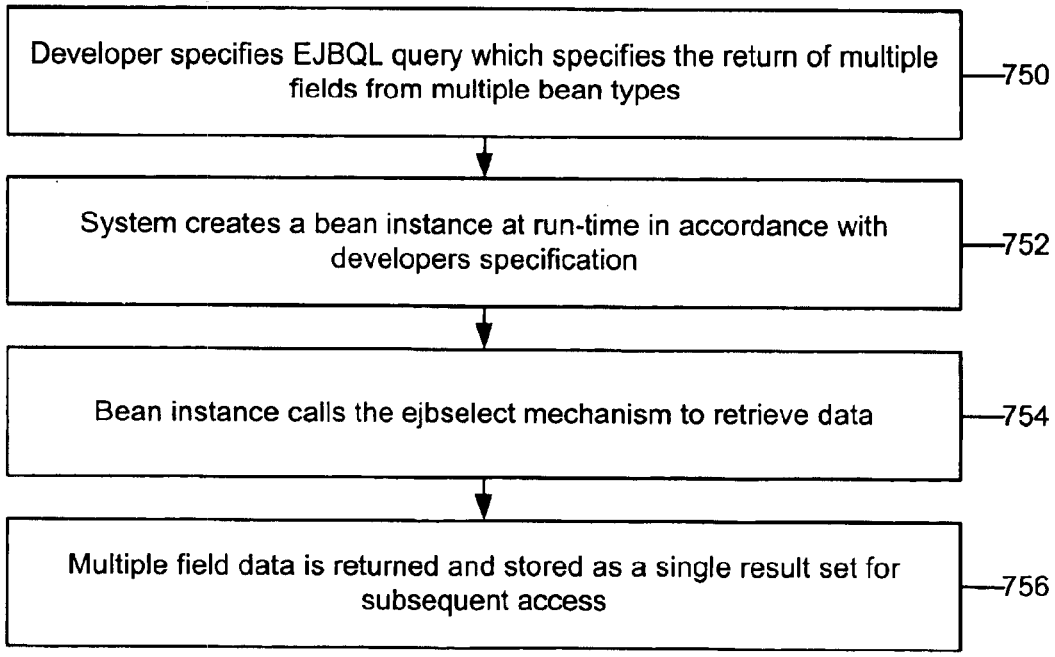
FIG. 8 shows an example of a data request in accordance with the invention wherein the returned results consists of multiple fields from a single bean type.
FIG. 9 shows a summary of a process in accordance with an embodiment of the invention that allows the developer to specify a ResultSet for the retrieval of database data.

FIG. 8 shows an example of a multiple field, single bean type data request in accordance with the invention. The example statement 700, shown in FIG. 8, may be written by the bean developer to efficiently retrieve an employee's name and zip code information from an employee or personnel database. As shown in FIG. 8, the "SELECT objA.name, objA.zip FROM EmployeeBean AS objA" statement is used to select both the name (objA.name) and zip code (objA.zip) information for all employees from the database, reference a particular EJB (EmployeeBean), and return the data in the form of a ResultSet. Simultaneously retrieving both the name and zip fields in this manner is more efficient than retrieving the same data using the traditional model which would include first selecting the set of EmployeeBean objects followed by retrieving the name and zip fields from each individual EmployeeBean object in the set.

FIG. 9 shows a flowchart of a process in accordance with an embodiment of the invention that allows the developer to use EJBQL to specify a ResultSet for the retrieval of database data which includes multiple fields from multiple bean types. In step 750, the developer first specifies an EJBQL query which specifies the return of multiple fields from multiple bean types. The system then, in step 752, creates a bean instance at run-time in accordance with these specifications. In step 754, the bean instance call the ejbSelect mechanism to retrieve the multiple field data, and in step 756 the data is returned and stored in a single result set for subsequent access.

EJB QL Compiler

A portion of the data retrieval process requires the system to parse and translate an EJB QL language query into a target language (SQL) for a target database. A variety of mechanisms may be employed to perform this EJB QL-SQL ("EJB QL") parsing and compilation. One embodiment utilizes "ANTLR" ('ANother Tool for Language Recognition') to generate an EJB QL parser using a supplied EJB QL grammar specification. The parser operates by taking an input EJB QL query and constructing an Abstract Syntax Tree that represents that EJB QL query. In accordance with this embodiment, the EJB QL-SQL Compiler takes the Abstract Syntax Tree that was generated by the EJB QL parser and processes the tree to produce the SQL translation of the EJB QL query. The translated SQL query is what is transmitted to the database for processing. The EJB QL parser and EJB QL-SQL compiler are referred to collectively as the "EJB QL compiler".

Additional Features

An embodiment of the invention includes support for QL Subqueries ("Subqueries"). The relationship between regular QL Queries ("Queries") and Subqueries is similar to the relationship between traditional SQL-queries and SQL-subqueries. Subqueries are Queries that may be used in the WHERE clause of an outer Query. The following is an example of a Query that selects all above-average students as determined by a number grade:

SELECT OBJECT(s) FROM StudentBean AS s WHERE s.grade> (SELECT AVG(s2.grade) FROM StudentBean AS s2)

The syntax for a Subquery is the same as for a normal Query.

Subquery Return Types

The Result of an Aggregate Function, eg:
SELECT MAX(emp.salary) FROM EmployeeBean AS emp
selects the single highest employee salary, while
SELECT emp.salary FROM EmployeeBean AS emp WHERE emp.dept 'finance'
selects all the salaries of the employees in the finance dept.
Supported WHERE clause operators that take Subqueries as argument include ALL, ANY, [NOT] IN, [NOT] EXISTS, and the Arithmetic Operators: <,>,<=,>=,=, and <>. Use of the DISTINCT clause in a Subquery will result in the use of an SQL 'SELECT DISTINCT' in the Subquery's generated SQL. This is different from the usage of DISTINCT in a main query, in which enforcement of the DISTINCT clause is done in the EJB container and not via the use of a generated SQL
SELECT OBJECT(emp) FROM EmployeeBean AS emp WHERE emp.salary>
(SELECT AVG(emp2.salary) FROM EmployeeBean AS emp2)
selects the employees whose salary is above average, and uses the '>' Operator on an uncorrelated subquery.
SELECT OBJECT(mainOrder) FROM OrderBean AS mainOrder
WHERE 10>
(SELECT COUNT (DISTINCT subOrder.ship_date)
FROM OrderBean AS subOrder
WHERE subOrder.ship_date> mainOrder.ship_date)
AND mainOrder.ship_date IS NOT NULL
selects the last 10 shipped Orders.
SELECT (cust) FROM CustomerBean AS cust
WHERE cust.num NOT IN
(SELECT order.cust_num FROM OrderBean AS order
WHERE cust.num=order.cust_num)
selects all customers that have not placed orders, and uses the 'NOT NULL' operator on a correlated subquery.

Support for Aggregate Functions

Aggregate Functions behave like their SQL Query Language Counterparts. Aggregate functions are evaluated over the range of the Beans returned by the WHERE conditions of the query. This property of Aggregate Functions means that an Aggregate Function is only a SELECT clause target and may not be used in other parts of a query, such as in the WHERE clause. The invention includes support for the following Aggregate Functions:

MIN(x)—Return the Minimum Value of this field.
SELECT MIN(t.price) FROM TireBean AS t WHERE t.size=?1
selects the lowest price for a tire of a given input size.
MAX(x)—Return the Maximum Value of this field.
SELECT MAX(s.customer_count) FROM SalesRepBean AS s WHERE s.city='Los Angeles'
selects the Maximum Number of Customers served by any single sales representative in Los Angeles.
AVG([DISTINCT]x)—Return the Average Value of this field.
SELECT AVG(b.price) FROM BookBean AS b WHERE b.category='computer_science'
selects the Average Price of a Book in the category Computer Science.
SUM( [DISTINCT]x)—Return the Sum of this field.
SELECT SUM(s.customer_count) FROM SalesRepBean AS s WHERE s.city='Los Angeles'
retrieves the total number of customers served by sales representatives in Los Angeles.
COUNT([DISTINCT]x)—Return the number of occurances of a field.
SELECT COUNT(s.deal.amount) FROM SalesRepBean AS s, IN(deal)s WHERE s.deal.status='closed' AND s.deal.amount>=1000000
retrieves the number of deals closed that were for at least 1 million dollars.

Support for Queries returning ResultSets

The queries executed by an ejbSelect method can return the results of multi-column, multi-object-type queries in the form of a java.sql.ResultSet. These queries may also specify the return of aggregates of columns in the returned java.sql.ResultSet. To support these features, the invention allows the SELECT clause to specify a comma delimited list of target fields and aggregates of fields, e.g.:
SELECT e.location, AVG(e.salary) FROM FinderEmployeeBean e GROUP BY e.location, 2
returns a java.sql.ResultSet with rows whose Columns are the Employee Locations and the Average Salary of the Employees at those Locations.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that the above described EJB QL enhancements can be incorporated into other types of database request mechanisms beyond those described. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for accessing data in a database using container managed persistence enterprise Java beans (EJBs), wherein each instance of the container managed persistence enterprise Java bean object represents a row of data in the database, the method comprising the steps of:

(a) receiving a single EJB select method at a container managed persistence EJB object to access multiple data of related container managed persistence EJB objects, wherein said multiple data is present in corresponding related rows in different tables of a database;

(b) translating an EJB query language (EJBQL) query of said single EJB select method into a target language query of said database;

(c) retrieving data from said database using said target language query wherein said step of retrieving data from the persistent store allows direct access, including bypassing a bean representation of the requested data;

(d) saving said data as a result set object containing the retrieved data in response to the target language query, wherein said result set object retains the relationships between the data corresponding to the original database schema; and, (e) allowing access to said result set object to retrieve said data.

2. The method of claim 1 wherein said select method is an ejbSelect method.

3. The method of claim 1 wherein said select method is expressed as bean objects.

4. The method of claim 1 wherein said select method is expressed as a bean object name.

5. The method of claim 1 wherein said select method is expressed in terms of the data to be returned.

6. The method of claim 1 wherein said result set is comprised of multiple data types from multiple bean objects.

7. The method of claim 1 wherein said result set is comprised of multiple data types from a single bean object.

8. The method of claim 1 wherein said result set is comprised of a single data type from multiple bean objects.

9. The method of claim 1 wherein said access is read-only.

10. A method of providing access to a database using container managed persistence enterprise java beans (EJBs), comprising the steps of:

reading a single EJBQL query which specifies the return of multiple fields from at least one bean type, wherein each instance of the enterprise Java bean object represents a row of data in different tables of the database;

creating a container managed persistence enterprise java bean instance at run-time in accordance with said EJBQL query;

translating said EJBQL query into a target language query of said database;

calling the retrieval method to retrieve the multiple field data using said target language query wherein said step of retrieving data from persistent store allows direct access, including bypassing a bean representation of the requested data; and, returning the data as a single result set for subsequent access, wherein said result set retains the relationships between the data corresponding to the original database schema.

11. The method of claim 10 wherein said select method is an ejbSelect method.

12. The method of claim 10 wherein said select method is expressed as bean objects.

13. The method of claim 10 wherein said select method is expressed as a bean object name.

14. The method of claim 10 wherein said select method is expressed in terms of the data to be returned.

15. The method of claim 10 wherein said result set is comprised of multiple data types from multiple bean objects.

16. The method of claim 10 wherein said result set is comprised of multiple data types from a single bean object.

17. The method of claim 10 wherein said result set is comprised of a single data type from multiple bean objects.

18. The method of claim 10 wherein said access is read-only.

19. A system for accessing data using container managed persistence enterprise Java beans (EJBs), including instructions therein which when read and executed cause the system to perform the steps of:

receiving a single EJB select method at a container managed persistence EJB object to access multiple data of related container managed persistence EJB objects, wherein said multiple data is present in corresponding related rows in different tables of a database;

translating an EJB query language (EJBQL) query of said single EJB select method into a target language query of said database;

retrieving data from said database using said target language query wherein said step of retrieving data from the persistent store allows direct access, including bypassing a bean representation of the requested data;

saving said data as a result set object containing the retrieved data in response to the target language query, wherein said result set object retains the relationships between the data corresponding to the original database schema; and, allowing access to said result set object to retrieve said data.

20. A system for providing access to a database using container managed persistence enterprise java beans (EJBs), including instructions therein which when read and executed cause the system to perform the steps of:

reading a single EJBQL query which specifies the return of multiple fields from at least one container managed persistence enterprise java bean (EJB) type, wherein each instance of the container managed persistence enterprise Java bean object represents a row of data in different tables of the database;

creating a bean instance at run-time in accordance with said query;

translating said EJBQL query into a target language query of said database;

calling the retrieval method to retrieve the multiple field data using said target language query; wherein said step of retrieving data from the persistent store allows direct access, including bypassing a bean representation of the requested data; and, returning the data as a single result set for subsequent access, wherein said result set retains the relationships between the data corresponding to the original database schema.

* * * * *